(12) United States Patent
Katayama et al.

(10) Patent No.: US 7,150,295 B2
(45) Date of Patent: Dec. 19, 2006

(54) FUEL CELL HOSE

(75) Inventors: Kazutaka Katayama, Kasugai (JP); Hiroaki Ito, Kasugai (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 11/359,491

(22) Filed: Feb. 23, 2006

(65) Prior Publication Data

US 2006/0191588 A1  Aug. 31, 2006

(30) Foreign Application Priority Data

Feb. 25, 2005  (JP) .............................. 2005-051288

(51) Int. Cl.
*F16L 11/00* (2006.01)
(52) U.S. Cl. .................... 138/137; 138/141; 428/36.91
(58) Field of Classification Search ................ 138/137, 138/141; 428/36.91
See application file for complete search history.

(56) References Cited

U.S. PATENT DOCUMENTS

| | | | | |
|---|---|---|---|---|
| 6,391,412 B1 * | 5/2002 | Hata et al. | .................. | 428/36.7 |
| 6,555,243 B1 * | 4/2003 | Flepp et al. | .............. | 428/474.4 |
| 6,638,602 B1 * | 10/2003 | Itada et al. | .................. | 428/172 |
| 6,830,792 B1 * | 12/2004 | Matsuoka et al. | .......... | 428/35.7 |
| 6,884,482 B1 * | 4/2005 | Hayashi et al. | ............. | 428/36.7 |
| 7,011,114 B1 * | 3/2006 | Suzuki et al. | ................ | 138/137 |
| 2003/0118766 A1 * | 6/2003 | Koike et al. | .............. | 428/36.91 |
| 2005/0189030 A1 * | 9/2005 | Katayama et al. | .......... | 138/137 |

FOREIGN PATENT DOCUMENTS

JP  2002-213659  7/2002

* cited by examiner

*Primary Examiner*—James Hook
(74) *Attorney, Agent, or Firm*—Westerman, Hattori, Daniels & Adrian, LLP.

(57) ABSTRACT

A fuel cell hose which is superior in flexibility (low-temperature flexibility) and in barrier performance against hydrogen gas or water without causing a defect such as buckling or cracking at the time of the press-fitting of a connector. The fuel cell hose comprises an inner layer in contact with fluid, a barrier layer formed on an outer peripheral surface of the inner layer and an outer layer formed on an outer peripheral surface of the barrier layer. The inner layer is made of a material (A) containing a polyolefin resin and a styrene-isobutylene block copolymer as essential components, the barrier layer is made of a material (B) containing an ethylene-vinyl alcohol copolymer and a modified polyolefin resin as essential components and the mixing ratio by volume of the ethylene-vinyl alcohol copolymer to the modified polyolefin resin is in the range of 95/5 to 30/70, and the outer layer is made of a material (C) containing a polyamide resin as an essential component. The barrier layer has an island-sea structure in which island phases composed of the modified polyolefin resin are dispersed in a sea phase composed of the ethylene-vinyl alcohol copolymer.

8 Claims, 2 Drawing Sheets

FUEL CELL HOSE

BACKGROUND OF THE INVENTION

1. Field of the Invention

The present invention relates to a fuel cell hose, and more particularly, it relates to a fuel cell hose that can be used as a hose for transporting pure water and a hydrogen hose for transporting hydrogen or steam-containing hydrogen, etc., which are used for a fuel cell system.

2. Description of Art

A power generation system using a fuel cell system (in particular a Proton Exchange Membrane fuel cell) has been highly expected as a future power generation system. However, it is said that the region for generating electricity in such a fuel cell system significantly deteriorates in its performance due to an external contaminant such as sulfur or a metal ion. For this reason, it is required that a hose to be used in a fuel cell system should have a low extractability, (i.e., a property that the material tends not to be extracted by water or the like flowing through a hose) and should be clean. Further, when a fuel cell system is used particularly for a vehicle, one of the important issues remaining is how to cool a great amount of heat generated thereby. Thus, it is said that the role taken by the cooling system is significantly important, however there is a concern that when the electrical conductivity of a coolant such as LLC (Long Life Coolant) increases, electrical short-circuiting may occur. Therefore, it is required for a hose to be used in a fuel cell system to maintain the insulation performance against internal fluid (water or LLC), in other words, to suppress ion extraction so as not to increase the electrical conductivity of the fluid.

Heretofore, under such circumstances, a stainless (SUS) tube has been used in many cases because of its low ion dissolution. However, when an SUS tube is used, it is difficult to mold the SUS tube or to compensate for any installation errors, which causes problems in terms of layout and assembly. In addition, SUS tubes have a problem of poor vibration durability and the like For this reason, a resin hose in which a resin is used has been recently used for a fuel cell hose instead of conventional SUS tubes. For example, a hydrogen hose comprising an inner layer made of a material selected from a polypropylene (PP) resin, a polyethylene (PE) resin, an olefin thermoplastic elastomer (TPO), a fluorine-containing resin and a styrol resin, an intermediate layer made of an ethylene vinyl alcohol copolymer (EVOH), and an outer layer made of a polyamide resin has been proposed (see, for example, Japanese Unexamined Patent Publication No. 2002-213659 (Patent Document 1)).

However, the inner layer of the hydrogen hose described in the Patent Document 1 is made of a polypropylene (PP) resin or the like, therefore, the inner layer is hard and inferior in flexibility. Accordingly, when such a hose is cooled to a low temperature (about −40° C.) and bent to 180°, abnormalities such as cracking on an inner or outer surface of the hose may occur, i.e., the hose is inferior in low-temperature flexibility. Also, defects such as buckling or cracking may occur when a connector is press fitted to the hose. Further, when the inner layer of the hydrogen hose is made of the olefin thermoplastic elastomer (TPO), it is inferior in barrier performance against water or hydrogen gas. Further, there are disadvantages in that when the inner layer of the hydrogen hose is made of the fluorine-containing resin, it is inferior in barrier performance against hydrogen gas, and in particular when the inner layer is made of a soft fluorine-containing resin such as tetrafluoroethylene-perfluoroalkylvinyl ether copolymer (PFA), it is also inferior in barrier performance against water.

SUMMARY OF THE INVENTION

The present invention has been made in view of the above circumstances, and it is an object of the present invention to provide a fuel cell hose which is superior in flexibility (low-temperature flexibility) and in barrier performance against hydrogen gas or water without causing a defect such as buckling or cracking at the time of the press-fitting of a connector to the hose.

In order to achieve the above object, a fuel cell hose of the present invention comprises an inner layer in contact with fluid, a barrier layer formed on an outer peripheral surface of the inner layer and an outer layer formed on an outer peripheral surface of the barrier layer, and the inner layer is made of a material (A) containing a polyolefin resin and a styrene-isobutylene block copolymer as essential components, the barrier layer is made of a material (B) containing an ethylene-vinyl alcohol copolymer and a modified polyolefin resin as essential components and the mixing ratio by volume of the ethylene-vinyl alcohol copolymer to the modified polyolefin resin is in the range of 95/5 to 30/70, and the outer layer is made of a material (C) containing a polyamide resin as an essential component, and the barrier layer has an island-sea structure in which island phases composed of the modified polyolefin resin are dispersed in a sea phase composed of the ethylene-vinyl alcohol copolymer.

That is, the present inventors had the idea that the problems concerning low-temperature flexibility and connector press-fit performance might be solved by using a thermoplastic elastomer (TPE) by blending it into a polyolefin resin for forming an inner layer and have made intensive studies on various thermoplastic elastomers (TPE). As a result, they found that when an inner layer is formed by blending a styrene-based TPE such as a styrene-butadiene-styrene (SBS) block copolymer, a styrene-isoprene-styrene (SIPS) block copolymer or a styrene-ethylenebutene-styrene (SEBS) block copolymer into a polyolefin resin, the problem concerning such as low-temperature flexibility can be solved to a certain degree, however, the barrier performance against hydrogen gas or water decreases. Based on this finding, the present inventors continued studies on thermoplastic elastomers (TPE) that does not impair the barrier performance against hydrogen gas or water, and as a result, they found that when an inner layer is formed by blending a styrene-isobutylene block copolymer into a polyolefin resin, the problems concerning low-temperature flexibility and connector press-fit performance can be solved without impairing the barrier performance against hydrogen gas or water. Further, the present inventors paid attention to a barrier layer, and found that when a barrier layer is formed by using a modified polyolefin resin by blending it into art ethylene-vinyl alcohol copolymer at a predetermined ratio so as to have an island-sea structure in which island phases composed of the modified polyolefin resin are dispersed in a sea phase composed of the ethylene-vinyl alcohol copolymer, a good result can be obtained, thus the present invention has been attained. That is, when the barrier layer of a fuel cell hose is formed so as to have the island-sea structure as described above, barrier performance against hydrogen gas or water can be ensured due to the sea phase composed of the ethylene-vinyl alcohol copolymer, and also low impact resistance that is a weakness when an ethylene-vinyl alcohol copolymer is used alone can be improved due to the island phases composed of the modified polyolefin resin, whereby a defect such as buckling or cracking is not caused when a connector is press fitted to the hose, and a desired object can be achieved.

In this way, in the fuel cell hose of the present invention, an inner layer is formed with a material for the inner layer containing a polyolefin resin and a styrene-isobutylene block copolymer as essential components, therefore the problems concerning low-temperature flexibility and connector press-fit performance can be solved without impairing the barrier performance against hydrogen gas or water. Further, a barrier layer is formed by using a modified polyolefin resin by blending it into an ethylene-vinyl alcohol copolymer at a predetermined ratio so as to have an island-sea structure in which island phases composed of the modified polyolefin resin are dispersed in a sea phase composed of the ethylene-vinyl alcohol copolymer. Therefore, barrier performance against hydrogen gas or water can be ensured due to the sea phase composed of the ethylene-vinyl alcohol copolymer, and also low impact resistance that is a weakness when an ethylene-vinyl alcohol copolymer is used alone can be improved due to the island phases composed of the modified polyolefin resin, whereby a defect such as buckling or cracking is not caused when a connector is press fitted to the hose. Accordingly, an advantageous effect in that the fuel cell hose of the present invention is superior in flexibility (low-temperature flexibility) and in barrier performance against hydrogen gas or water without causing a defect such as buckling or cracking at the time of the press-fitting of a connector can be obtained.

Further, the fuel cell hose of the present invention can be formed in such a manner that any of the constituent layers does not contain a plasticizer without so much difficulty. In the present invention, the plasticizer means a chemical compound having a plasticizing action such as n-butylbenzene sulfone amide and also containing sulfur (S) in its molecular structure. In particular, when any of the constituent layers of the hose does not contain such a plasticizer, contamination of fluid flowing through the hose does not occur and thus the hose is excellent in low extractability, whereby a decrease in electrical generating capacity can be suppressed.

Further, when the mixing ratio by weight of the polyolefin resin to the styrene-isobutylene block copolymer in the material for the inner layer is set within a predetermined range, the balance of the barrier performance and the low-temperature flexibility becomes favorable.

Further, when the outer layer is formed by blending a styrene-isobutylene block copolymer into a polyamide resin, the balance of the barrier performance and the low-temperature flexibility becomes favorable.

DESCRIPTION OF THE PREFERRED EMBODIMENTS

Embodiments of the present invention will hereinafter be described in detail.

Figure 1:
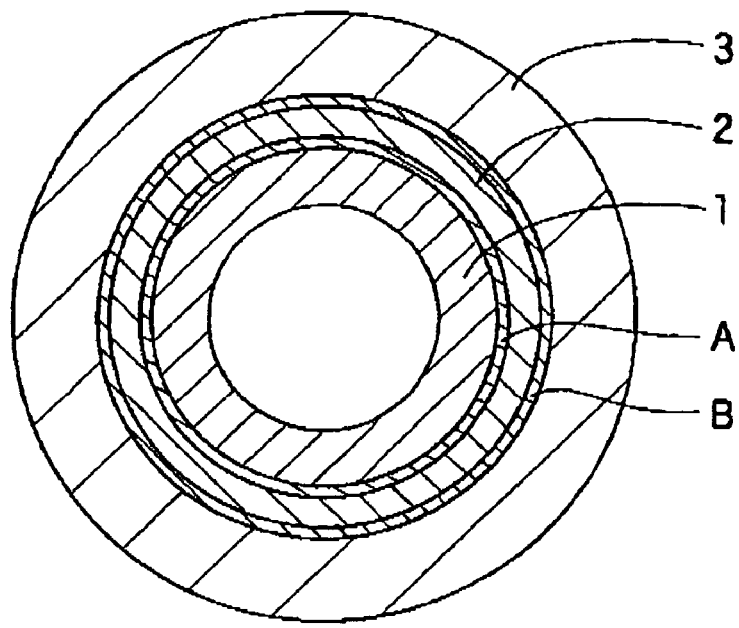
FIG. 1 is a sectional view illustrating one example of a fuel cell hose according to the present invention.

A fuel cell hose of the present invention has a structure in which, for example, as shown in FIG. 1, a barrier layer 2 is formed on an outer peripheral surface of an inner layer 1 and further an outer layer 3 is formed on an outer peripheral surface of the barrier layer 2, and an adhesive layer A and an adhesive layer B are provided between the inner layer 1 and the barrier layer 2, and between the barrier layer 2 and the outer layer 3, respectively.

In the present invention, the barrier layer 2 has an island-sea structure in which island phases composed of a modified polyolefin resin are dispersed in a sea phase composed of an ethylene-vinyl alcohol copolymer, which is the main feature of the present invention.

As a material for forming the inner layer 1, a polyolefin resin and a styrene-isobutylene block copolymer are used as essential components.

The polyolefin resin is not particularly limited, however, examples thereof include, for example, a polypropylene (PP) resin, a polyethylene (PE) resin, a polybutene resin, a polymethyl pentene resin and the like. These may be used alone or in combination of two or more. Among them, a polypropylene (PP) resin is preferably used in terms of heat-resistance and availability.

Further, the styrene-isobutylene block copolymer to be used together with the polyolefin resin is not particularly limited as long as polystyrene (PS) is used as a hard segment and polyisobutylene (PIB) is used as a soft segment. Examples thereof include, for example, a styrene-isobutylene diblock copolymer (SIB), a styrene-isobutylene-styrene triblock copolymer (SIBS) and the like. Among them, SIBS is preferably used because it is excellent in strength. Specific examples of SIBS include SIBSTAR available from Kaneka Corporation and the like.

In the material for the inner layer, the mixing ratio by weight of the polyolefin resin to the styrene-isobutylene block copolymer is preferably in the range of 20/80 to 80/20, particularly preferably in the range of 60/40 to 40/60. When the mixing ratio by weight of the polyolefin resin is less than 20 (or when the mixing ratio by weight of the styrene-isobutylene block copolymer exceeds 80), the barrier performance tends to deteriorate. On the contrary, when the mixing ratio by weight of the polyolefin resin exceeds 80 (or when the mixing ratio by weight of the styrene-isobutylene block copolymer is less than 20), the resulting fuel cell hose becomes too hard, and the low-temperature flexibility and the connector press-fit performance tend to deteriorate.

In the material for the inner layer, in addition to the polyolefin resin and the styrene-isobutylene block copolymer, a compatibilizer, carbon black, a carbon-based electrically conductive agent, a clay, a pigment or the like may be appropriately mixed as needed.

As the material for forming the barrier layer 2, an ethylene-vinyl alcohol copolymer (EVOH) and a modified polyolefin resin are used as essential components.

The modified polyolefin resin is not particularly limited as long as an island phase can be formed with it. Examples thereof include, for example, a resin obtained by modifying a polyolefin resin with an acid component of such as maleic anhydride or a hydroxyl group, a copolymer of an olefin monomer such as ethylene and a monomer other than the olefin monomer and the like. These may be used alone or in combination of two or more.

Examples of the resin obtained by modifying a polyolefin resin with an acid component include, for example, a resin obtained by modifying a polyolefin resin such as a polypropylene (PP) resin, a polyethylene (PE) resin, a low density polyethylene (LDPE) resin or a high density polyethylene (HDPE) resin with an acid component of such as maleic anhydride or carboxylic acid, and the like. These may be used alone or in combination of two or more. Further, examples of the resin obtained by modifying a polyolefin resin with a hydroxyl group include, for example, PE or PP with a hydroxyl group at an end thereof, and the like.

Examples of the copolymer of an olefin monomer and a monomer other than the olefin monomer include, for example, ethylene-glycidyl methacrylate (EGMA), an ethylene-glycidyl methacrylate (GMA)-vinyl acetate ternary copolymer, an ethylene-glycidyl methacrylate (GMA)-methyl acrylate ternary copolymer, an ethylene-methyl acrylate copolymer, an ethylene-methyl acrylate-acrylic acid ternary copolymer, an ethylene-ethyl acrylate (EEA) copolymer, an ethylene-methacrylate copolymer, an ethylene-vinyl acetate copolymer (EVAc), an ethylene-acrylate-maleic anhydride ternary copolymer and the like. Further, one obtained by modifying any of these copolymers may be used, and examples thereof include, for example, a modified EGMA, a modified EEA, a modified ethylene-ethyl acrylate-maleic anhydride copolymer, a modified EVAc and the like. These may be used alone or in combination of two or more.

Examples of the modified EGMA include, for example, one obtained by grafting polystyrene (PS), polymethyl methacrylate (PMMA), an acrylonitrile-styrene copolymer (AS), a copolymer of PMMA and butyl acrylate or the like to EGMA and the like.

Further, examples of the modified EEA include, for example, one obtained by grafting PS, PMMA, AS, a copolymer of PMMA and butyl acrylate or the like to EEA, a maleic anhydride-modified EEA, a silane-modified EEA and the like.

Examples of the modified ethylene-ethyl acrylate-maleic anhydride copolymer include, for example, one obtained by grafting PS, PMMA, AS, a copolymer of PMMA and butyl acrylate or the like to an ethylene-ethyl acrylate-maleic anhydride copolymer and the like.

Examples of the modified EVAc include, for example, one obtained by grafting PS, PMMA, AS, a copolymer of PMMA and butyl acrylate or the like to EVAc and the like.

Here, the mixing ratio by volume of the EVOH to the modified polyolefin resin is in the range of 95/5 to 30/70, preferably in the range of 90/10 to 40/60. When the mixing ratio by volume of the EVOH exceeds 95 (or when the mixing ratio by volume of the modified polyolefin resin is less than 5), the impact resistance tends to deteriorate. On the contrary, when the mixing ratio by volume of the EVOH is less than 30 (or when the mixing ratio by volume of the modified polyolefin resin exceeds 70), the island-sea structure is reversed, and the barrier performance tends to deteriorate.

Further, the EVOH and the modified polyolefin resin preferably satisfy the relationship that the melt mass flow rate (MFR) of the EVOH is higher than that of the modified polyolefin resin. Specifically, the MFR of the EVOH preferably is in the range of 2 to 20 g/10 min, and the MFR of the modified polyolefin resin preferably is in the range of 0.3 to 25 g/10 min. Incidentally, the MFR is expressed as a value measured at 230° C. under a load of 2160 g in accordance with ISO 1133.

Figure 2:
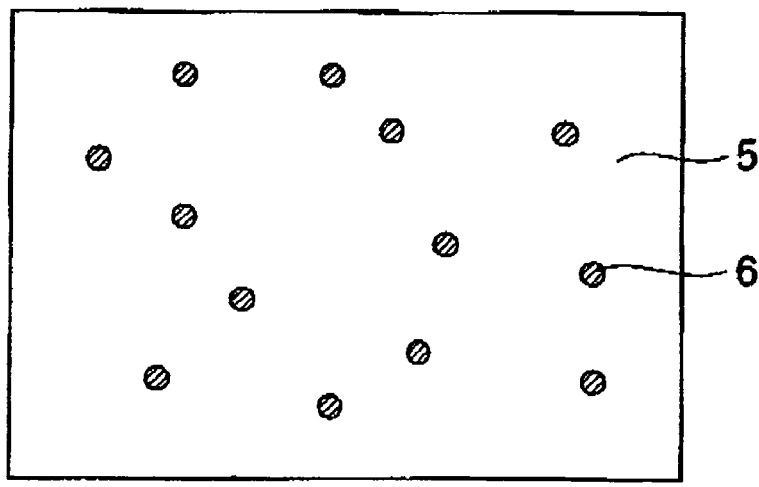
FIG. 2 is a schematic view illustrating one example of an island-sea structure of a barrier layer of a fuel cell hose according to the present invention.
Figure 3:
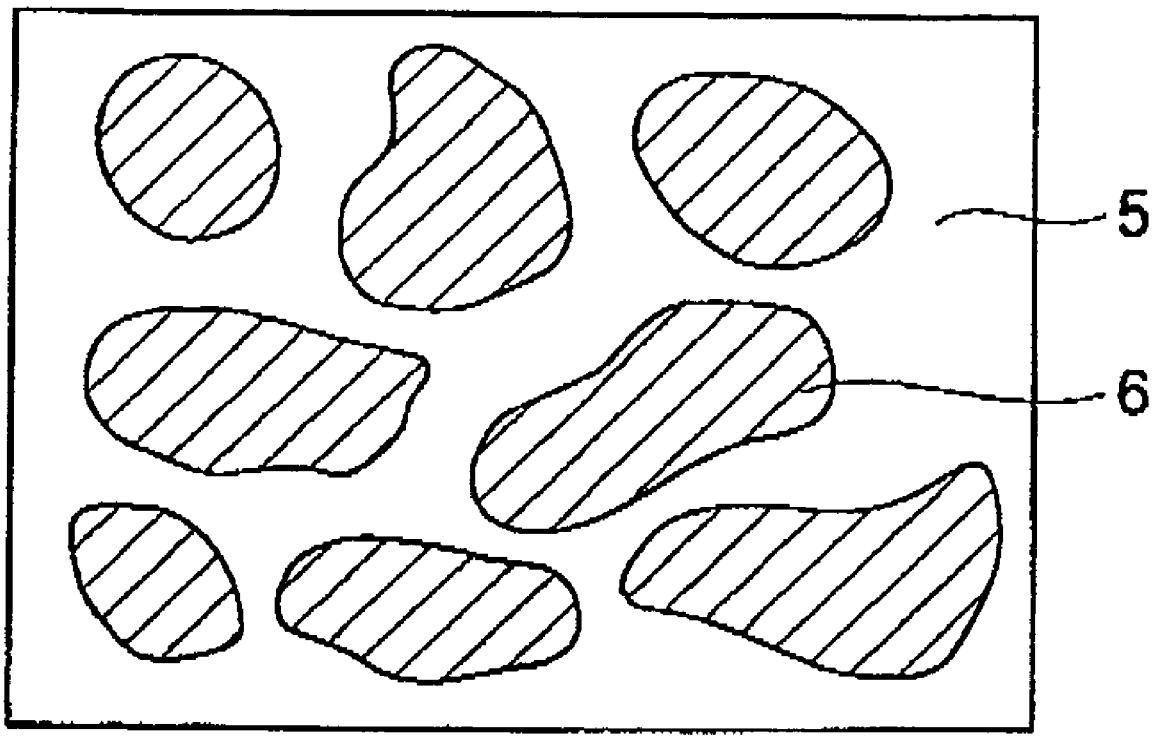
FIG. 3 is a schematic view illustrating another example of an island-sea structure of a barrier layer of a fuel cell hose according to the present invention.

In the present invention, the barrier layer 2 has, as described above, an island-sea structure in which island phases composed of the modified polyolefin resin are dispersed in a sea phase composed of the ethylene-vinyl alcohol copolymer. The island-sea structure of the barrier layer 2 varies depending on the mixing ratio by volume of the EVOH and the modified polyolefin resin as described above, and for example, when the mixing ratio by volume of the EVOH to the modified polyolefin resin is 95/5, the barrier layer has an island-sea structure as shown in FIG. 2. On the other hand, when the mixing ratio by volume of the EVOH to the modified polyolefin resin is 30/70, it has an island-sea structure as shown in FIG. 3. In the drawings, 5 denotes the sea phase composed of the ethylene-vinyl alcohol copolymer and 6 denotes the island phases composed of the modified polyolefin resin. In the present invention, the sea phase 5 refers to a phase surrounding the island phases 6. Incidentally, it is considered that the ratio by volume of the sea to island phases in the barrier layer 2 substantially corresponds to the mixing ratio by volume of the EVOH to the modified polyolefin resin to be used for the material for the barrier layer.

The island-sea structure as described above can be identified, for example, by sectioning the barrier layer 2 to expose its cross-section, staining the sectioned barrier layer with iodine (for example, at room temperature for about 1 hour), further sectioning a piece (about 0.5×0.5 mm square) of the sectioned barrier layer to expose its surface and then observing the surface with a scanning electron microscope (SEM). That is, since the phase composed of the EVOH is stained with iodine, when being irradiated with an electron beam, this region reflects the electron beam and appears whitish, however, the phase composed of the modified polyolefin resin is not stained with iodine, therefore it appears blackish. Due to such a difference in color, observation of the island-sea structure can be carried out.

In the material for the barrier layer, in addition to the EVOH and the modified polyolefin resin, an unmodified polyolefin, a thermoplastic elastomer, a compatibilizer or the like may be appropriately mixed as needed.

As the material for forming the outer layer 3, a polyamide resin is used as an essential component.

The polyamide resin is not particularly limited. Examples thereof include, for example, polyamide 6 (PA6), polyamide 66 (PA66), polyamide 99 (PA99), polyamide 610 (PA610), polyamide 612 (PA612), polyamide 11 (PA11), polyamide 910 (PA910), polyamide 912 (PA912), polyamide 12 (PA12), a copolymer of polyamide 6 and polyamide 66 (PA6/66), a copolymer of polyamide 6 and polyamide 12 (PA6/12) and the like. These may be used alone or in combination of two or more. Among them, PA12, PA11, PA910 or PA912 is preferably used because they are excellent in resistance to calcium chloride.

As the material for the outer layer, a modified polyolefin elastomer, a styrene-isobutylene block copolymer or the like may be used together with the polyamide resin. Examples of the styrene-isobutylene block copolymer include the same copolymers mentioned for the material for the inner layer.

In the material for the outer layer, the mixing ratio by weight of the polyamide resin to the styrene-isobutylene block copolymer is preferably in the range of 20/80 to 90/10, particularly preferably in the range of 40/60 to 90/10. When the mixing ratio by weight of the polyamide resin is less than 20 (or when the mixing ratio by weight of the styrene-isobutylene block copolymer exceeds 80), the rigidity is so low that buckling tends to occur. On the contrary, when the mixing ratio by weight of the polyamide resin exceeds 90 (or when the mixing ratio by weight of the styrene-isobutylene block copolymer is less than 10), the flexibility, the water permeation barrier performance, or the like which is an effect specific to the styrene-isobutylene block copolymer, tends to deteriorate.

Further, in the material for the outer layer, a compatibilizer may be mixed in addition to the polyamide resin and the styrene-isobutylene block copolymer. When the compatibilizer is mixed therein, advantageous effects in that the dispersibility of the polyamide resin and the styrene-isobutylene block copolymer is improved and also the elongation of the hose is improved can be obtained.

Examples of the compatibilizer include, for example, an ethylene-glycidyl methacrylate (EGMA), a modified EGMA, an ethylene-glycidyl methacrylate-vinyl acetate ternary copolymer, an ethylene-glycidyl methacrylate-methyl acrylate ternary copolymer, an ethylene-methyl acrylate copolymer, an ethylene-methyl acrylate-acrylic acid ternary copolymer, an ethylene-ethyl acrylate (EEA) copolymer, a modified EEA, a modified ethylene-ethyl acrylate-maleic anhydride copolymer, an ethylene-methacrylate copolymer, an acrylic rubber, an ethylene-vinyl acetate copolymer (EVAc), a modified EVAc, a modified polypropylene (PP), a modified polyethylene (PE), an ethylene-acrylate-maleic anhydride ternary copolymer, an epoxidized styrene-butadiene-styrene block copolymer (an epoxidized SBS), an epoxidized styrene-ethylene butene-styrene block copolymer (an epoxidized SEBS), an acid-modified SBS, an acid-modified SEBS, a styrene-isopropenyl oxazoline copolymer, a glycidyl methacrylate-methyl methacrylate copolymer, a glycidyl methacrylate-styrene copolymer, a thermoplastic urethane and the like. These may be used alone or in combination of two or more.

Examples of the modified EGMA include, for example, one obtained by grafting polystyrene (PS), polymethyl methacrylate (PMMA) an acrylonitrile-styrene copolymer (AS), a copolymer of PMMA and butyl acrylate or the like to EGMA and the like.

Examples of the modified EEA include, for example, one obtained by grafting PS, PMMA, AS, a copolymer of PMMA and butyl acrylate or the like to EEA, a maleic anhydride-modified EEA, a silane-modified EEA and the like.

Examples of the modified ethylene-ethyl acrylate-maleic anhydride copolymer include, for example, one obtained by grafting PS, PMMA, AS, a copolymer of PMMA and butyl acrylate or the like to an ethylene-ethyl acrylate-maleic anhydride copolymer and the like.

Examples of the modified EVAc include, for example, one obtained by grafting PS, PMMA, AS, a copolymer of PMMA and butyl acrylate or the like to EVAc and the like.

Examples of the modified PP include, for example, one obtained by grafting PS or AS to PP, a maleic anhydride-modified PP, a hydroxyl group-modified PP and the like.

Examples of the modified PE include, for example, one obtained by grafting PS, PMMA, AS, a copolymer of PMMA and butyl acrylate or the like to a low-density polyethylene (LDPE), a maleic anhydride-modified PE, a hydroxyl group-modified PP and the like.

The mixing ratio of the compatibilizer is preferably not more than 10 parts by weight (hereinafter simply abbreviated as parts) relative to 100 parts of the total amount of the polyamide resin and the styrene-isobutylene block copolymer, particularly preferably in the range of 2 to 5 parts. Addition of the compatibilizer may further improve physical properties such as elongation, however, when the mixing ratio exceeds 10 parts, the water permeability resistance deteriorates, so that the barrier performance of the styrene-isobutylene block copolymer tends to deteriorate.

The material for forming the adhesive layer A provided between the inner layer 1 and the barrier layer 2 and the adhesive layer B provided between the barrier layer 2 and the outer layer 3 is not particularly limited. Examples thereof include, for example, an acid-modified polyolefin resin modified with maleic anhydride or the like, a blend mainly composed of a polyolefin and a nylon (a polyamide), the same compatibilizers as described above and the like. These may be used alone or in combination of two or more.

The fuel cell hose of the present invention, as shown in FIG. 1, can be produced, for example, as follows. The polyolefin resin and the styrene-isobutylene block copolymer, and, if needed, any of the other components are mixed at a predetermined ratio and then the resulting mixture is kneaded with a twin screw extruder at a predetermined temperature (preferably at 190 to 220° C.), whereby the material for the inner layer is prepared. Further, the EVOH and the modified polyolefin resin are mixed at a predetermined ratio by volume, and, if needed, any of the other components is blended therein at a predetermined ratio, and then the resulting mixture is melt-kneaded with a twin screw extruder, whereby the material for the barrier layer is prepared. Further, if needed, the styrene-isobutylene block copolymer or the like is blended in the polyamide resin at a predetermined ratio and then the resulting mixture is kneaded with a twin screw extruder at a predetermined temperature (preferably at 190 to 250° C.), whereby the material for forming the outer layer is prepared. Further, the material for the adhesive layer is prepared. Then, an extruder for each of the inner layer, the barrier layer, the outer layer and the adhesive layer is prepared. Each material is extruded from each extruder and is combined into one die, and then is passed through a sizing die, whereby a fuel cell hose comprising the inner layer 1, the adhesive layer A, the barrier layer 2, the adhesive layer B and the outer layer 3 formed in this order (see FIG. 1) can be produced. When a hose is formed into a corrugated shape, a corrugated fuel cell hose having predetermined dimensions can be produced by passing the thus extruded molten tube through a corrugate forming machine.

In the thus obtained fuel cell hose of the present invention, the inner diameter of the hose is preferably in the range of 2 to 40 mm, particularly preferably in the range of 2.5 to 36 mm, and the outer diameter of the hose is preferably in the range of 3 to 44 mm, particularly preferably in the range of 4 to 40 mm. The thickness of the inner layer 1 is preferably in the range of 0.02 to 1.0 mm, particularly preferably in the range of 0.05 to 0.6 mm. The thickness of the barrier layer 2 is preferably in the range of 0.1 to 1.0 mm, particularly preferably in the range of 0.2 to 0.5 mm. The thickness of the outer layer 3 is preferably in the range of 0.2 to 1.5 mm, particularly preferably in the range of 0.3 to 1.0 mm. Further, the thickness of the adhesive layers A and B is generally in the range of 0.05 to 0.2 mm, preferably in the range of 0.05 to 0.1 mm.

In the fuel cell hose of the present invention, the flexural modulus of the inner layer 1 is preferably in the range of 100 to 1400 MPa, particularly preferably in the range of 500 to 1000 MPa. The flexural modulus of the barrier layer 2 is preferably in the range of 1000 to 3800 MPa, particularly preferably in the range of 1200 to 3600 MPa. The flexural modulus of the outer layer 3 is preferably in the range of 350 to 1200 MPa, particularly preferably in the range of 600 to 1000 MPa. Incidentally, the flexural modulus is expressed as a value measured in accordance with ISO 178.

The structure of the fuel cell hose of the present invention is not limited to the above-mentioned five-layer structure as shown in FIG. 1, and for example, an innermost layer may be provided on an inner peripheral surface of the inner layer 1 or an outermost layer may be provided on an outer peripheral surface of the outer layer 3.

In the fuel cell hose of the present invention, it is preferred that any of the constituent layers does not contain a plasticizer. In the present invention, the plasticizer means a chemical compound having a plasticizing action and containing sulfur (S) in its molecular structure as described above. In particular, when any of the constituent layers of the hose does not contain such a plasticizer, contamination of fluid flowing through the hose does not occur and thus the hose is excellent in low extractability, whereby a decrease in electrical generating capacity can be suppressed.

The fuel cell hose of the present invention can be used as a hose for transporting pure water and a hydrogen hose for transporting hydrogen or hydrogen-containing water, etc., which are used for a fuel cell system.

EXAMPLES

Next, an explanation will be made of Examples and Comparative Examples.

Prior to the explanation of Examples and Comparative Examples, the following materials were prepared.

Polypropylene (PP) Resin

MITSUI POLYPRO E111G, available from Mitsui Chemical Co., Ltd.

Styrene-isobutylene-styrene Triblock Copolymer (SIBS)

SIBSTAR 103T-U available from Kaneka Corporation

EVOH-a

EVAL F101A, available from Kuraray Co., Ltd., MFR: 5.2 g/10 min

EVOH-b

EVAL L171, available from Kuraray Co., Ltd., MFR; 6.8 g/10 min

Modified Polyolefin Resin a (modified PO-a)

Maleic Anhydride-modified HDPE (ADTEX ER403A, available from Japan Polyolefin Co., Ltd., MFR: 0.6 g/10 min)

Modified Polyolefin Resin b (modified PO-b)

Ethylene-glycidyl methacrylate (GMA)-vinyl acetate ternary copolymer (ethylene/GMA/vinyl acetate=83/12/5 (ratio by volume)) (BONDFAST 2B, available from Sumitomo Chemical Co., Ltd., MFR: 9 g/10 min)

PA12-a

UBESTA 3030B available from Ube Industries, Ltd.

PA12-b

Modified olefin elastomer alloy polyamide 12 (GRILAMIDE L25A NZ, available from EMS Showa Denko KK.)

Compatibilizer A

Modified EGMA obtained by grafting polystyrene to EGMA (MODIPER A4100, available from NOF Corporation)

Compatibilizer B

Epoxidized SBS (EPOFRIEND AT501 available from Daicel Chemical Industries, Ltd.)

Example 1

The components of the material for an inner layer shown in Table 1 below were mixed at a ratio shown in the same table, and the resulting mixture was kneaded with a twin screw extruder at 200° C., whereby the material for the inner layer was prepared. The components of the material for a barrier layer shown in Table 1 below that have been dry-blended at a ratio shown in the same table were kneaded with a twin screw extruder while the barrel temperature and the die temperature were set to 100° C. and 230° C., respectively, to melt the resins mainly by the heat generated by shearing, whereby the material for the barrier layer was prepared. The components of the material for an outer layer shown in Table 1 below were mixed at a ratio shown in the same table, and then the resulting mixture was kneaded with a twin screw extruder at 200° C., whereby the material for the outer layer was prepared. As the material for an adhesive layer, maleic anhydride-modified PP (ADMER QF500, available from Mitsui Chemical Co., Ltd) was prepared. Then, an extruder for each of the inner layer, the barrier layer, the outer layer and the adhesive layer was prepared. Each material was extruded from each extruder and was combined into one die, and then was passed through a sizing die, whereby a hose comprising the inner layer, the adhesive layer A, the barrier layer, the adhesive layer B and the outer layer formed in this order (an inner diameter of 6 mm and an outer diameter of 8 mm) was produced.

Examples 2 to 9, Comparative Examples 2 and 3

A hose was produced in accordance with Example 1, except that the material for an inner layer, a barrier layer or an outer layer was changed to a combination shown in Table 1 and Table 2 below.

Comparative Example 1

A hose comprising an inner layer, an adhesive layer A and an outer layer formed in this order (an inner diameter of 6 mm and an outer diameter of 8 mm) was produced in accordance with Example 1, except that a barrier layer was not formed between the inner layer and the outer layer.

By using each of the hoses of Examples and Comparative Examples obtained in this way, evaluation of the respective properties was carried out according to the following criteria. These results are also shown in Table 1 and Table 2 below Helium Permeability To the end portions of each of the hoses of Examples and Comparative Examples, a metal pipe (equipped with a manometer and a valve for connection to a compressed gas cylinder) was connected via a connecting joint available from Swagelok Co., Ltd. Then, helium was introduced into each of the hoses at a pressure of 0.5 MPa, and the hose was let stand for 1 week in an atmosphere of 90° C. Thereafter, the temperature was lowered to room temperature, and the helium permeability (cc/H/m) was calculated from the change in the pressure and the length of the connected hose using the gas equation.

Low-Temperature Flexibility

Each of the hoses of Examples and Comparative Examples was cooled to −40° C. for 4 hours and bent to 180°, and then evaluation of the low-temperature flexibility was carried out. One in which abnormalities such as cracking on an inner or outer surface of the hose occurred was evaluated as X, and one in which abnormalities did not occur was evaluated as O.

Connecter Press-fit Performance

A connector was press fitted to each of the hoses of Examples and Comparative Examples. One in which abnormalities such as buckling or cracking occurred was evaluated as X, and one in which abnormalities did not occur was evaluated as O.

Island-sea Structure of Barrier Layer

The barrier layer of each of the hoses of Examples and Comparative Examples was sectioned to expose its cross-section, and the sectioned barrier layer was stained with iodine at room temperature for 1 hour. Then, the piece of the sectioned barrier layer, which was about 0.5×0.5 mm square, was further sectioned to expose its surface, and the island-sea structure was observed with a scanning electron microscope (SEM).

TABLE 1

(Parts by weight for the inner layer and the outer layer, and parts by volume for the barrier layer)

| | | Examples | | | | | | | |
|---|---|---|---|---|---|---|---|---|---|
| | | 1 | 2 | 3 | 4 | 5 | 6 | 7 | 8 |
| Inner layer | PP | 50 | 60 | 60 | 60 | 20 | 50 | 50 | 80 |
| | SIBS | 50 | 40 | 40 | 40 | 80 | 50 | 50 | 20 |
| Barrier layer | EVOH-a | 95 | — | — | 30 | — | — | — | — |
| | EVOH-b | — | 95 | 95 | — | 95 | 95 | 95 | 95 |
| | Modified PO-a | 5 | — | — | 70 | — | — | — | — |
| | Modified PO-b | — | 5 | 5 | — | 5 | 5 | 5 | 5 |
| Outer layer | PA12-a | 100 | 90 | — | 100 | 60 | 60 | 60 | 20 |
| | PA12-b | — | 10 | 100 | — | — | — | — | — |
| | SIBS | — | — | — | — | 40 | 40 | 40 | 80 |
| | Compatibilizer A | — | — | — | — | — | 10 | — | — |
| | Compatibilizer B | — | — | — | — | — | — | 10 | 20 |
| Thickness (mm) | Inner layer | 0.40 | 0.40 | 0.40 | 0.40 | 0.30 | 0.20 | 0.20 | 0.20 |
| | Adhesive layer A | 0.05 | 0.05 | 0.05 | 0.05 | 0.05 | 0.05 | 0.05 | 0.05 |
| | Barrier layer | 0.20 | 0.20 | 0.20 | 0.20 | 0.10 | 0.20 | 0.20 | 0.20 |
| | Adhesive layer B | 0.05 | 0.05 | 0.05 | 0.05 | 0.05 | 0.05 | 0.05 | 0.05 |
| | Outer layer | 0.30 | 0.30 | 0.30 | 0.30 | 0.50 | 0.50 | 0.50 | 0.50 |
| Helium permeability (*) | | 2.1 | 1 | 0.8 | 2.5 | 2.6 | 1.1 | 1.3 | 0.9 |
| Low-temperature flexibility | | O | O | O | O | O | O | O | O |
| Connecter press-fit performance | | O | O | O | O | O | O | O | O |
| Island-sea structure of barrier layer | Sea phase | EVOH | EVOH | EVOH | EVOH | EVOH | EVOH | EVOH | EVOH |
| | Island phase | Modified PO | Modified PO | Modified PO | Modified PO | Modified PO | Modified PO | Modified PO | Modified PO |

(*): cc/H/m

TABLE 2

(Parts by weight for the inner layer and the outer layer, and parts by volume for the barrier layer)

| | | Example | Comparative Examples | | |
|---|---|---|---|---|---|
| | | 9 | 1 | 2 | 3 |
| Inner layer | PP | 60 | 100 | 60 | 60 |
| | SIBS | 40 | — | 40 | 40 |
| Barrier layer | EVOH-a | — | — | 100 | 25 |
| | EVOH-b | 95 | — | — | — |
| | Modified PO-a | — | — | — | 75 |
| | Modified PO-b | 5 | — | — | — |
| Outer layer | PA12-a | 60 | 100 | 100 | 100 |
| | PA12-b | — | — | — | — |
| | SIBS | 40 | — | — | — |
| | Compatibilizer A | 5 | — | — | — |
| | Compatibilizer B | — | — | — | — |
| Thickness (mm) | Inner layer | 0.40 | 0.40 | 0.40 | 0.40 |
| | Adhesive layer A | 0.05 | 0.10 | 0.05 | 0.05 |
| | Barrier layer | 0.20 | — | 0.20 | 0.20 |
| | Adhesive layer B | 0.05 | — | 0.05 | 0.05 |
| | Outer layer | 0.30 | 0.50 | 0.30 | 0.30 |
| Helium permeability (*) | | 0.7 | 9.2 | 1.6 | 8.5 |
| Low-temperature flexibility | | O | X | O | O |
| Connecter press-fit performance | | O | X | X | O |
| Island-sea structure of barrier layer | Sea phase | EVOH | — | EVOH | Modified PO |
| | Island phase | Modified PO | — | — | EVOH |

(*): cc/H/m

As can be understood from the above results, all the hoses of Examples had low helium permeability and were superior in barrier performance as well as low-temperature flexibility, and abnormalities such as buckling or cracking did not occur when a connector was press fitted to the hose. Further, when the barrier layer was observed, the island phases composed of the modified polyolefin (PO) resin were dispersed in the sea phase composed of EVOH in any of the hoses of Examples.

On the contrary, the hose of comparative Example 1 had high helium permeability because it did not have a barrier layer, and also it was inferior in low-temperature flexibility and abnormalities such as buckling or cracking occurred when a connector was press fitted to the hose because SIBS was not blended into the material for the inner layer. The hose of Comparative Example 2 had lower helium permeability compared with the hose of Comparative Example 1 because it had a barrier layer, however, this barrier layer was composed of only EVOH, therefore it was inferior in impact resistance and abnormalities such as buckling or cracking occurred when a connector was press fitted to the hose. As for the hose of Comparative Example 3, a barrier layer was formed by blending a modified polyolefin resin into EVOH, therefore the impact resistance could be improved compared with the hose of Comparative Example 2. However, the blending ratio of the modified polyolefin resin was too high, therefore the island-sea structure was reversed, whereby the helium permeability became high, and the barrier performance deteriorated compared with the hoses of Examples.

The fuel cell hose of the present invention can be used as a hose for transporting pure water and a hydrogen hose for transporting hydrogen or steam-containing hydrogen, etc., which are used for a fuel cell system.

What is claimed is:

1. A fuel cell hose comprising an inner layer in contact with fluid, a barrier layer formed on an outer peripheral surface of the inner layer and an outer layer formed on an outer peripheral surface of the barrier layer, wherein the inner layer is made of a material (A) containing a polyolefin resin and a styrene-isobutylene block copolymer as essential components, the barrier layer is made of a material (B) containing an ethylene-vinyl alcohol copolymer and a modified polyolefin resin as essential components and the mixing ratio by volume of the ethylene-vinyl alcohol copolymer to the modified polyolefin resin is in the range of 95/5 to 30/70, and the outer layer is made of a material (C) containing a polyamide resin as an essential component, and the barrier layer has an island-sea structure in which island phases composed of the modified polyolefin resin are dispersed in a sea phase composed of the ethylene-vinyl alcohol copolymer.

2. The fuel cell hose according to claim 1, wherein any of the constituent layers of the fuel cell hose does not contain a plasticizer.

3. The fuel cell hose according to claim 2, wherein the mixing ratio by weight of the polyolefin resin to the styrene-isobutylene block copolymer in the material (A) for the inner layer is in the range of 20/80 to 80/20.

4. The fuel cell hose according to claim 3, wherein the material (C) for the outer layer contains a styrene-isobutylene block copolymer together with the polyamide resin.

5. The fuel cell hose according to claim 2, wherein the material (C) for the outer layer contains a styrene-isobutylene block copolymer together with the polyamide resin.

6. The fuel cell hose according to claim 1, wherein the mixing ratio by weight of the polyolefin resin to the styrene-isobutylene block copolymer in the material (A) for the inner layer is in the range of 20/80 to 80/20.

7. The fuel cell hose according to claim 6, wherein the material (C) for the outer layer contains a styrene-isobutylene block copolymer together with the polyamide resin.

8. The fuel cell hose according to claim 1, wherein the material (C) for the outer layer contains a styrene-isobutylene block copolymer together with the polyamide resin.

* * * * *